United States Patent
Kuo (10) Patent No.: US 9,830,810 B2
(45) Date of Patent: Nov. 28, 2017

(54) INFRARED CONTROL SYSTEM AND OPERATION METHOD THEREOF

(71) Applicant: ASUSTeK COMPUTER INC., Taipei (TW)

(72) Inventor: Chun-Liang Kuo, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 120 days.

(21) Appl. No.: 14/970,544

(22) Filed: Dec. 16, 2015

(65) Prior Publication Data
US 2016/0180702 A1    Jun. 23, 2016

(30) Foreign Application Priority Data
Dec. 23, 2014   (TW) .............................. 103144976 A (51) Int. Cl.
*H04B 10/114*    (2013.01)
*G08C 23/04*    (2006.01)

(52) U.S. Cl.
CPC ......... *G08C 23/04* (2013.01); *H04B 10/1141* (2013.01)

(58) Field of Classification Search
CPC ............................ H04B 10/1141; G08C 23/04
See application file for complete search history.

(56) References Cited

U.S. PATENT DOCUMENTS

| | | | | |
|---|---|---|---|---|
| 4,924,216 A * | 5/1990 | Leung | ...................... | A63F 13/06 345/158 |
| 6,909,378 B1 * | 6/2005 | Lambrechts | .......... | G06F 3/0238 340/12.25 |
| 9,559,789 B2 * | 1/2017 | Kandir | ................... | H04B 11/00 |
| 2006/0250980 A1 * | 11/2006 | Pereira | ................ | H04L 12/2803 370/254 |
| 2010/0167646 A1 * | 7/2010 | Alameh | .................. | G06F 3/017 455/41.2 |
| 2013/0050392 A1 * | 2/2013 | Chiang | ............ | H04N 21/21805 348/14.01 |
| 2013/0139218 A1 * | 5/2013 | Roulland | ................ | G06F 21/42 726/3 |
| 2015/0302738 A1 * | 10/2015 | Geerlings | ............... | G08C 17/02 340/5.25 |
| 2015/0318874 A1 * | 11/2015 | Donaldson | ............. | H04B 11/00 367/135 |
| 2016/0073151 A1 * | 3/2016 | Keller | .............. | H04N 21/42208 348/734 |

FOREIGN PATENT DOCUMENTS

| | | |
|---|---|---|
| CN | 1727911 | 2/2006 |
| CN | 102707260 | 10/2012 |
| CN | 103761860 | 4/2014 |
| TW | 201324455 | 6/2013 |

* cited by examiner

*Primary Examiner* — Nathan Curs
(74) *Attorney, Agent, or Firm* — JCIPRNET (57) ABSTRACT

An infrared control system and an operation method thereof are provided. The infrared control system includes a sound sensor, an infrared transmitter and a processing unit. In an initialization period, the processing unit controls the infrared transmitter to transmit a first infrared control code of a first control code set to a target device, and monitors an environment sound via the sound sensor to determine whether the target device responds to the first infrared control code. If the processing unit determines that the target device responds to the first infrared control code according to environment sound, the processing unit records a relationship between the first control code set and the target device.

14 Claims, 7 Drawing Sheets

INFRARED CONTROL SYSTEM AND OPERATION METHOD THEREOF

CROSS-REFERENCE TO RELATED APPLICATION

This application claims the priority benefit of Taiwan application serial No. 103144976, filed on Dec. 23, 2014. The entirety of the above-mentioned patent application is hereby incorporated by reference herein and made a part of specification.

BACKGROUND OF THE INVENTION

Field of the Invention

The invention relates to a remote control device and, more particularly, to an infrared remote control system and an operation method thereof.

Description of the Related Art

An infrared remote control function is common in our daily life; however, most infrared remote control is unidirectional. An infrared remote controller cannot get a feedback from a controlled device (a target device). Conventionally, the infrared remote controller scans multiple control code sets manually and records a relationship between the control code sets and the target device. The user should select a control code set from the multiple control code sets one by one, and then transmit an infrared control code of the selected control code set to the target device. After the infrared control code is transmitted to the target device, the user should check whether the target device responds to the infrared control code with eyes. If the target device responds to the infrared control code, the user should press a button of the infrared remote controller timely to record the relationship between the selected control code set and the target device.

BRIEF SUMMARY OF THE INVENTION

According to a first aspect of the present disclosure, an infrared remote control system comprises: a sound sensor; an infrared transmitter; and a processing unit, wherein the processing unit controls the infrared transmitter to transmit a first infrared control code of a first control code set to a target device in an initialization period, and the processing unit monitors an environment sound via the sound sensor and determines whether the target device responds to the first infrared control code, if the processing unit determines that the target device responds to the first infrared control code according to the environment sound, the processing unit records a relationship between the first control code set and the target device.

Furthermore, according to a second aspect of the present disclosure, an operation method of an infrared remote control system comprises: controlling an infrared transmitter to transmit a first infrared control code of a first control code set to a target device in an initialization period by a processing unit; monitoring an environment sound by a sound sensor to determine whether the target device responds to the first infrared control code; and recording a relationship between the first control code set and the target device by the processing unit if the target device responds to the first infrared control code.

The infrared remote control system and the operation method thereof determine whether the target device responds to the infrared control code of the control code set automatically.

The processing unit of the infrared remote control system controls the infrared transmitter to transmit the infrared control code of the control code set to the target device in the initialization period, and the processing unit monitors the environment sound via the sound sensor to determine whether the target device responds to the infrared control code. If the processing unit determines that the target device responds to the first infrared control code according to the environment sound, the processing unit records the relationship between the control code set and the target device. Consequently, the infrared remote control system gets information of the target device via the feedback of the environment sound.

BRIEF DESCRIPTION OF THE DRAWINGS

These and other features, aspects and advantages of the invention will become better understood with regard to the following embodiments and accompanying drawings.

DETAILED DESCRIPTION OF THE EMBODIMENTS

The term "coupled" in the disclosure represents that two or more components are connected directly or indirectly. For example, a first device is coupled to a second device, which means, the first device is directly connected to the second device, or the first device is indirectly connected to the second device via other devices or other connection means. In addition, the same symbols denote the same or similar components/steps in embodiments. In different embodiments, the same symbols or terms of the same components/steps can refer to each other in the detail illustration.

Figure 1:
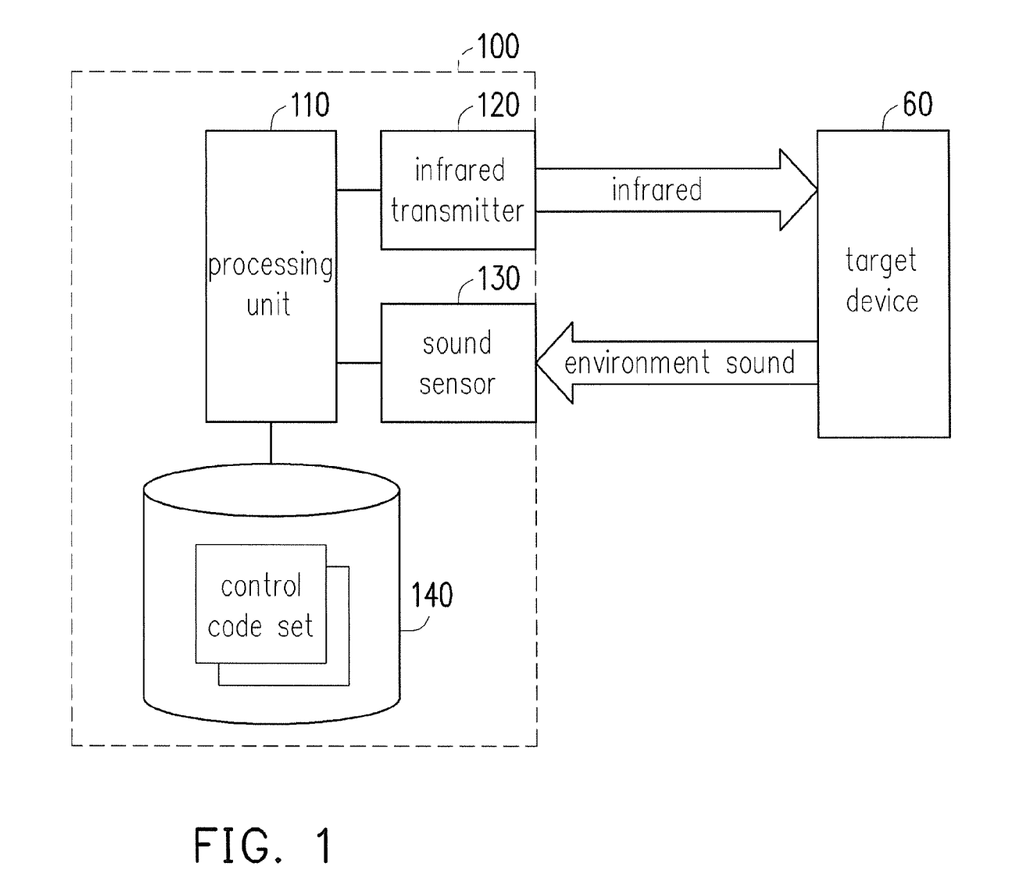
FIG. 1 is a block diagram showing a circuit of an infrared remote control system in an embodiment.

FIG. 1 is a block diagram showing a circuit of an infrared remote control system 100 in an embodiment. The infrared remote control system 100 includes a processing unit 110, an infrared transmitter 120, a sound sensor 130 and a database 140. The database 140 stores one or more control code sets. The processing unit 110 is coupled to the database 140, so as to access the control code set. The processing unit 110 is coupled to the infrared transmitter 120 to control the infrared transmitter 120 to transmit the infrared control code. The processing unit 110 is coupled to the sound sensor 130, so as to utilize the sound sensor 130 to monitor an environment sound.

Figure 2:
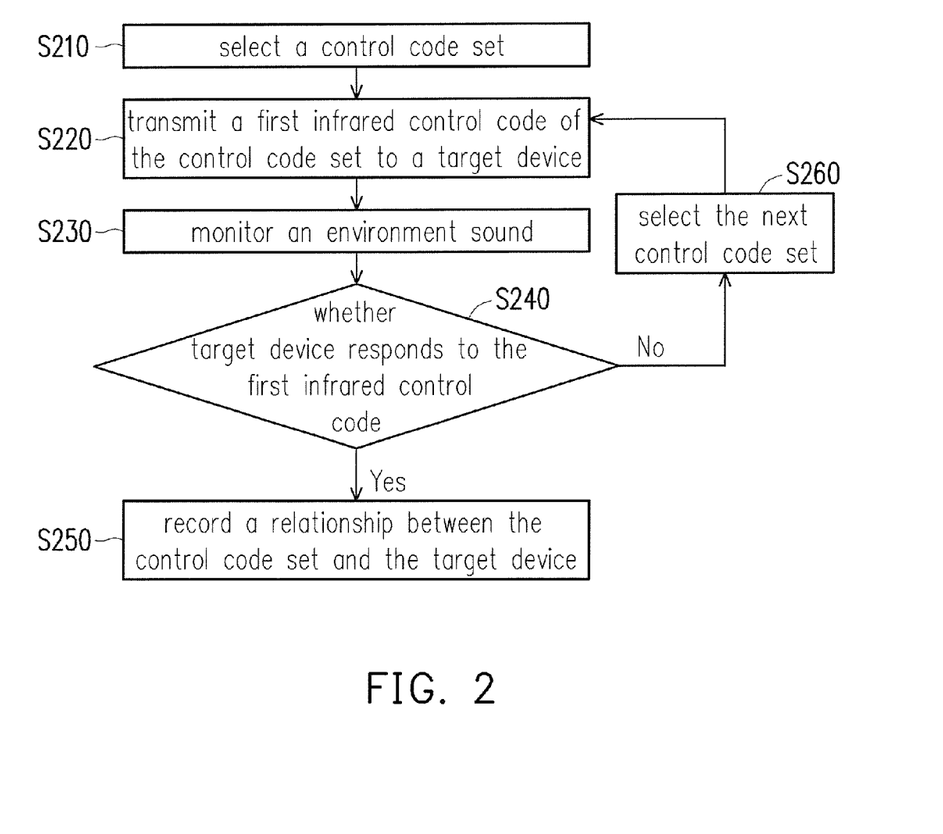
FIG. 2 is a flow chart showing an operation method of an infrared remote control system in an embodiment.

FIG. 2 is a flow chart showing an operation method of an infrared remote control system in an embodiment. Step S210 is to selects one control code set from the control code sets in the database 140 to regard as a selected control code set in an initialization period. In an embodiment, the processing unit 110 selects one control code set from the control code sets in the database 140 to regard as a selected control code set. The processing unit 110 can select one control code set from the control code sets of the database 140 by utilizing any selection algorithm. In an embodiment, the processing unit 110 selects the control code set one by one according to a sequence of indexes of the control code sets.

Step S220 is to control the infrared transmitter 120 to transmit the first infrared control code of the selected control code set to the target device 60, In an embodiment, the processing unit 110 controls the infrared transmitter 120 to transmit the first infrared control code of the selected control code set to the target device 60. The target device 60 is an infrared controlled device, such as a television, an air conditioner, an electric fan or an audible device, which is not limited herein. Step S230 is to monitor the environment sound via the sound sensor 130. In an embodiment, the processing unit 110 monitors the environment sound via the sound sensor 130. Step S240 is to determine whether the target device 60 responds to the first infrared control code according to the detected environment sound. In an embodiment, the processing unit 110 determines whether the target device 60 responds to the first infrared control code according to the detected environment sound. If the processing unit 110 determines that the target device 60 responds to the first infrared control code according to the environment sound, the processing unit 110 executes step S250 to record a relationship between the selected control code set and the target device 60.

In an embodiment, code structures and functions of the first infrared control code are not limited herein. In the embodiment, the function of the first infrared control code is a "turn off" instruction, which is not limited herein. For example, if the target device 60 is a television, the processing unit 110 controls the infrared transmitter 120 to transmit the "turn off" instruction (the first infrared control code) of the selected control code set to the television (the target device 60). If the selected control code set is adapted to the television (the target device 60), the television (the target device 60) is turned off in responding to the "turn off" instruction (the first infrared control code). The processing unit 110 monitors the environment sound via the sound sensor 130. The detected environment sound before the television (the target device 60) is turned off is large than the detected environment sound after the television (the target device 60) is turned off. Consequently, the processing unit 110 determines whether the target device (the target device 60) responds to the "turn off" instruction (the first infrared control code) according to the detected environment sounds before and after the television is turned off. If processing unit 110 determines that the television (the target device 60) responds to the "turn off" instruction (the first infrared control code) according to the detected environment sound before and after the television is turned off, the processing unit 110 records a relationship between the selected control code set and the television (the target device 60). After the record is finished, the processing unit 110 utilizes the selected control code set to remotely control the television (the target device 60) during normal operations.

In an embodiment, if the target device 60 is an air conditioner (or an electric fan), the processing unit 110 controls the infrared transmitter 120 to transmit a "turn on" instruction (the first infrared control code) of the selected control code set to the air conditioner (the target device 60). If the selected control code set is adapted to the air conditioner (the target device 60), fan blades of the air conditioner (the target device 60) rotates after the "turn on" instruction (the first infrared control code) is received. The processing unit 110 monitors the environment sound via the sound sensor 130. The detected environment sound before the air conditioner (the target device 60) is turned on is smaller than the detected environment sound after the air conditioner (the target device 60) is turned on. Consequently, the processing unit 110 determines whether the air conditioner (the target device 60) responds to the "turn on" instruction (the first infrared control code) according to the detected environment sound. If processing unit 110 determines that the air conditioner (the target device 60) responds to the "turn on" instruction (the first infrared control code) according to the environment sound before and after the air conditioner is turned on, the processing unit 110 records a relationship between the selected control code set and the air conditioner (the target device 60). After the record is finished, the processing unit 110 utilizes the selected control code set to remotely control the air conditioner (the target device 60) during normal operations.

According to the determination result of step S240, if processing unit 110 determines that the target device 60 does not respond to the first infrared control code according to the environment sound, the processing unit 110 executes step S260 to select another control code set from the database 140 as the selected control code set in an initialization period. Step S260 is to selects one control code set from the multiple control code sets of the database 140 by utilizing any selection algorithm. In an embodiment, the processing unit 110 selects one control code set from the multiple control code sets of the database 140 by utilizing any selection algorithm. In an embodiment, the processing unit 110 selects the control code set one by one according to a sequence of different indexes of the control code sets.

After the next control code set is selected as the selected control code set in step S260, the processing unit 110 controls the infrared transmitter 120 to transmit the infrared control code (such as an "turn off" instruction) of the selected control code set to the target device 60 in the initialization period (step S220), and the processing unit 110 monitors the environment sound via the sound sensor 130 (step S230) to determine whether the target device 60 responds to the infrared control code (step S240). If processing unit 110 determines that the target device 60 responds to the infrared control code according to the environment sound, the processing unit 110 records the relationship between the selected control code set and the target device 60 (step S250).

In other words, in the above embodiment, when the sound sensor 130 monitors that the local target device 60 does not change the environment sound (that is, the local target device 60 does not respond to the first infrared control code), the processing unit 110 controls the infrared transmitter 120 to transmit the first infrared control code of the next control code set to the local target device 60 (step S220), and the sound sensor 130 monitors whether the local target device 60 changes the environment sound once again (step S230). If the determination result of step S240 is "yes", the processing unit 110 records the relationship between the first control code set and the local target device 60 (step S250). If the determination result of step S240 is "no", the processing unit 110 selects a next control code set from the database (step S260), and then step S220 is executed until the local target device 60 responds to the infrared remote control system 100. If the target device 60 does not respond to the first infrared control code is determined in step S240, the processing unit 110 executes steps S260, S220 and S230 again, the times of the execution is not limited herein. In an embodiment, the number of the times of the determination can be set by a user, or built in the processing unit 110, or controlled/set by a remote host (not shown), which is not limited herein.

Figure 3:
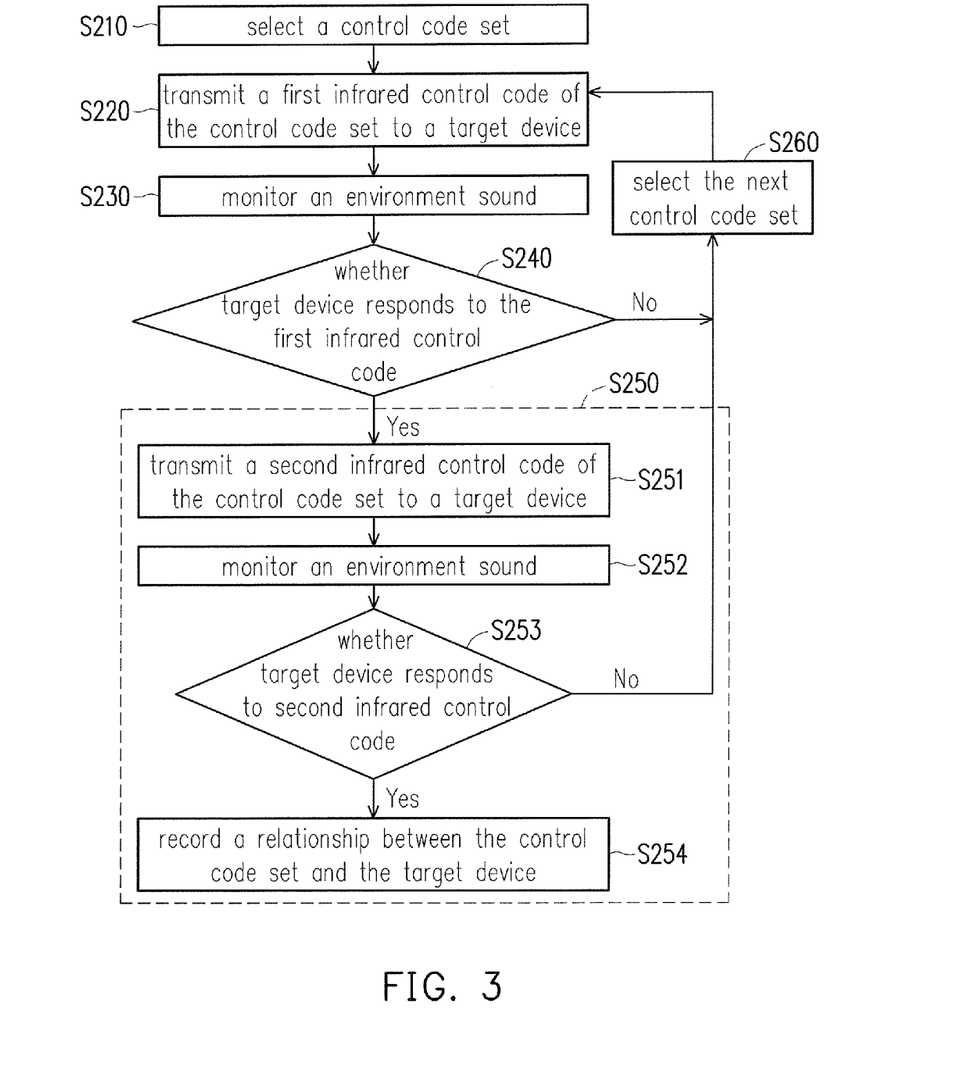
FIG. 3 is a flow chart showing an operation method of an infrared remote control system in an embodiment.

In different embodiments, step S250 in FIG. 2 can be executed in different ways. FIG. 3 is a flow chart showing an operation method of an infrared remote control system in an embodiment. Steps S210, S220, S230, S240, S250 and S260 in FIG. 3 can refer to steps S210, S220, S230, S240, S250 and S260 in FIG. 2. In the embodiment of FIG. 3, step S250 includes sub steps S251, S252, S253 and S254. Sometimes, other noise sources in the environment generate an irrelevant noise coincidentally when the infrared transmitter 120 transmits the first infrared control code. Then, the processing unit 110 maybe determines the irrelevant noise as the response sound of the target device 60 in step S240 by mistake. In order to avoid the mis-determination, the processing unit 110 executes step S251 to step S253 to confirm the relationship between the selected control code set and the target device 60 again.

Please refer to FIG. 1 and FIG. 3, after the target device 60 responds to the first infrared control code is determined in step S240, the processing unit 110 executes step S251 to control the infrared transmitter 120 to transmit the second infrared control code of the selected control code set to the target device 60. In step S252, the processing unit 110 monitors the environment sound via the sound sensor 130. In step S253, the processing unit 110 determines whether the target device 60 responds to the second infrared control code according to the detected environment sound. If the environment sound indicates that the target device 60 responds to the second infrared control code, the processing unit 110 executes step S254 to confirm and record the relationship between the selected control code set and the target device 60. According to the determination result of step S253, if the environment sound indicates that the target device 60 does not respond to the second infrared control code, the processing unit 110 executes step S260 to select another control code set from the database 140 as the selected control code set in the initialization period.

In an embodiment, code structures and functions of the second infrared control code are not limited. In the embodiment, the function of the second infrared control code is any instruction which enables the target device 60 to generate a sound. In an embodiment, the target device 60 is a television. The processing unit 110 controls the infrared transmitter 120 to transmit a "volume up" instruction (the second infrared control code) of the selected control code set to the television (the target device 60). If the selected control code set is adapted to the television (the target device 60), the volume of the television (the target device 60) is turned up when the television receives the "volume up" instruction (the second infrared control code). Consequently, the environment sound detected before the television (the target device 60) receives the "volume up" instruction (the second infrared control code) is smaller than the environment sound detected after the television (the target device 60) receives the "volume up" instruction (the second infrared control code). As a result, the processing unit 110 determines whether the television (the target device 60) responds to the "volume up" instruction (the second infrared control code) according to the detected environment sound. If the television (the target device 60) responds to the "volume up" instruction (the second infrared control code), the processing unit 110 confirms and records the relationship between the selected control code set and the television (the target device 60). After the record is finished, the processing unit 110 utilizes the selected control code set to remotely control the television (the target device 60) during normal operations.

If the local television (the target device 60) does not change the environment sound (that is, the local television does not respond to the second infrared control code), the processing unit 110 executes steps S260, S220, S230, S240, S251, S252 and S253, so as to control the infrared transmitter 120 to transmit the first infrared control code and the second infrared control code of next control code set to the local television (the target device 60), and the processing unit 110 monitors whether the local television (the target device 60) changes the environment sound via the sound sensor 130. If the determination result of S240 and S253 is "yes", the processing unit 110 confirms and records the relationship between the first control code set and the local television (the target device 60). If the determination result of step S240 or step S253 is "no", the processing unit 110 selects another control code set from the database (step S260), and then steps S220, S230, S240, S251, S252 and/or S253 are executed continuously until the determination result of steps S240 and S253 are both "yes".

Figure 4:
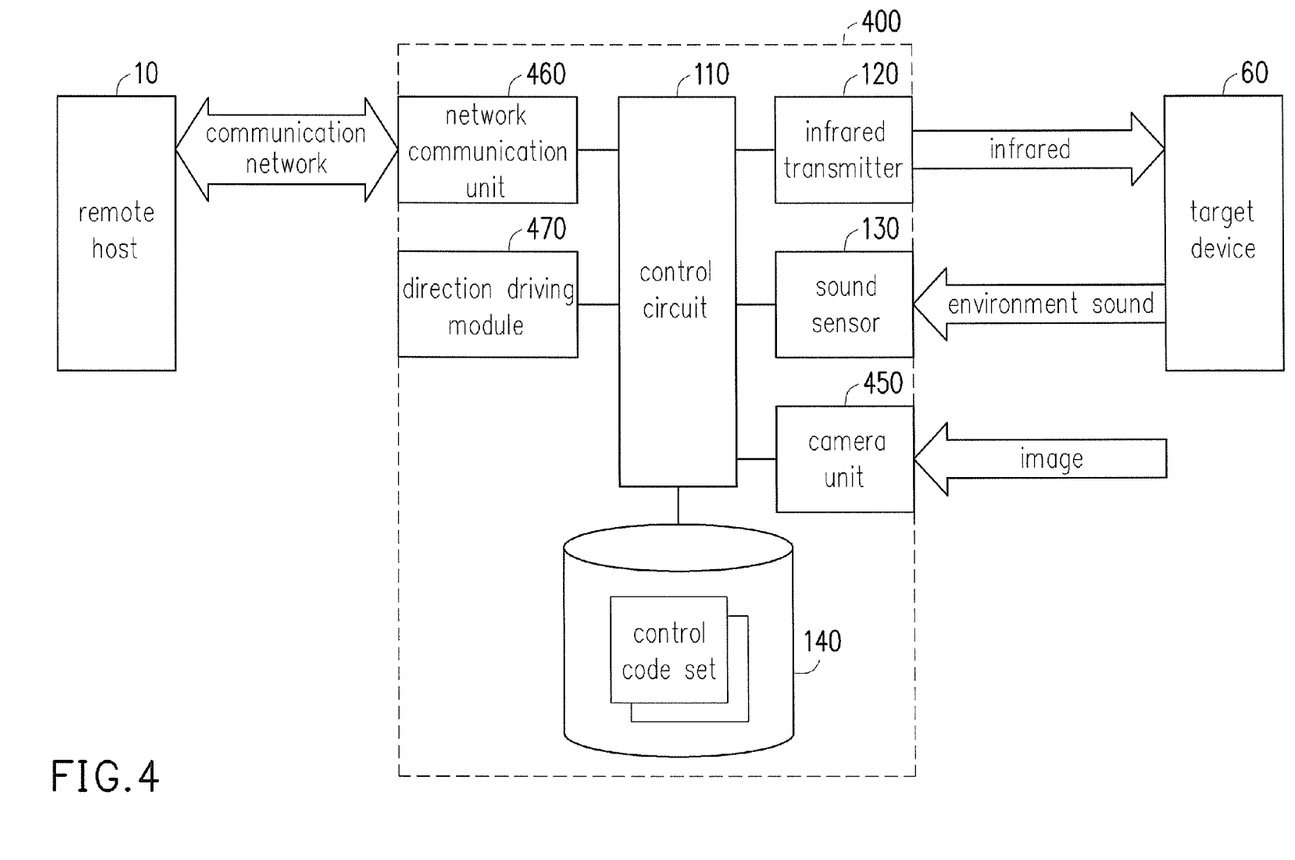
FIG. 4 is a block diagram showing a circuit of an infrared remote control system in an embodiment.

In different embodiments, the processing unit 110, the infrared transmitter 120 and/or the sound sensor 130 are disposed at the same device or the different devices. In an embodiment, the processing unit 110, the infrared transmitter 120 and the sound sensor 130 are disposed at a same Internet Protocol (IP) camera. FIG. 4 is a block diagram showing a circuit of an infrared remote control system in an embodiment. Please refer to FIG. 4, the IP camera 400 further includes a camera unit 450, a network communication unit 460 and a direction driving module 470 in the embodiment. In embodiments, the remote host 10 is a smartphone, a tablet computer, a notebook computer, a personal computer or a control platform, which is not limited herein. The remote host 10 is connected to the IP camera 400 via the communication network. The processing unit 110 provides a local image captured by the camera unit 450 to the remote host 10 via the network communication unit 460 and the communication network. The processing unit 110 adjusts a zoom factor of the image captured by the camera unit 450, so as to resizes the target device 60 in the image. The direction driving module 470 adjusts a capture direction of the camera unit 450 according to the control of the processing unit 110. In an embodiment, the direction driving module 470 is a motor, a gear, a screw and/or any other mechanisms to control/change pan direction and/or tilt direction of the camera unit 450.

The IP camera 400 further includes an infrared remote controller function in the embodiment. The remote host 10 remotely controls the IP camera 400 to make the processing unit 110 transmit the corresponding infrared control code to the target device 60 via the infrared transmitter 120 and monitor the local environment sound simultaneously. The processing unit 110 determines whether the target device 60 responds to the infrared control code according to the environment sound. The processing unit 110, the infrared transmitter 120, the sound sensor 130 and the database 140 in FIG. 4 can refer to the processing unit 110, the infrared transmitter 120, the sound sensor 130 and the database 140 in FIG. 1 and FIG. 2, which are omitted herein for a concise purpose.

Figure 5:
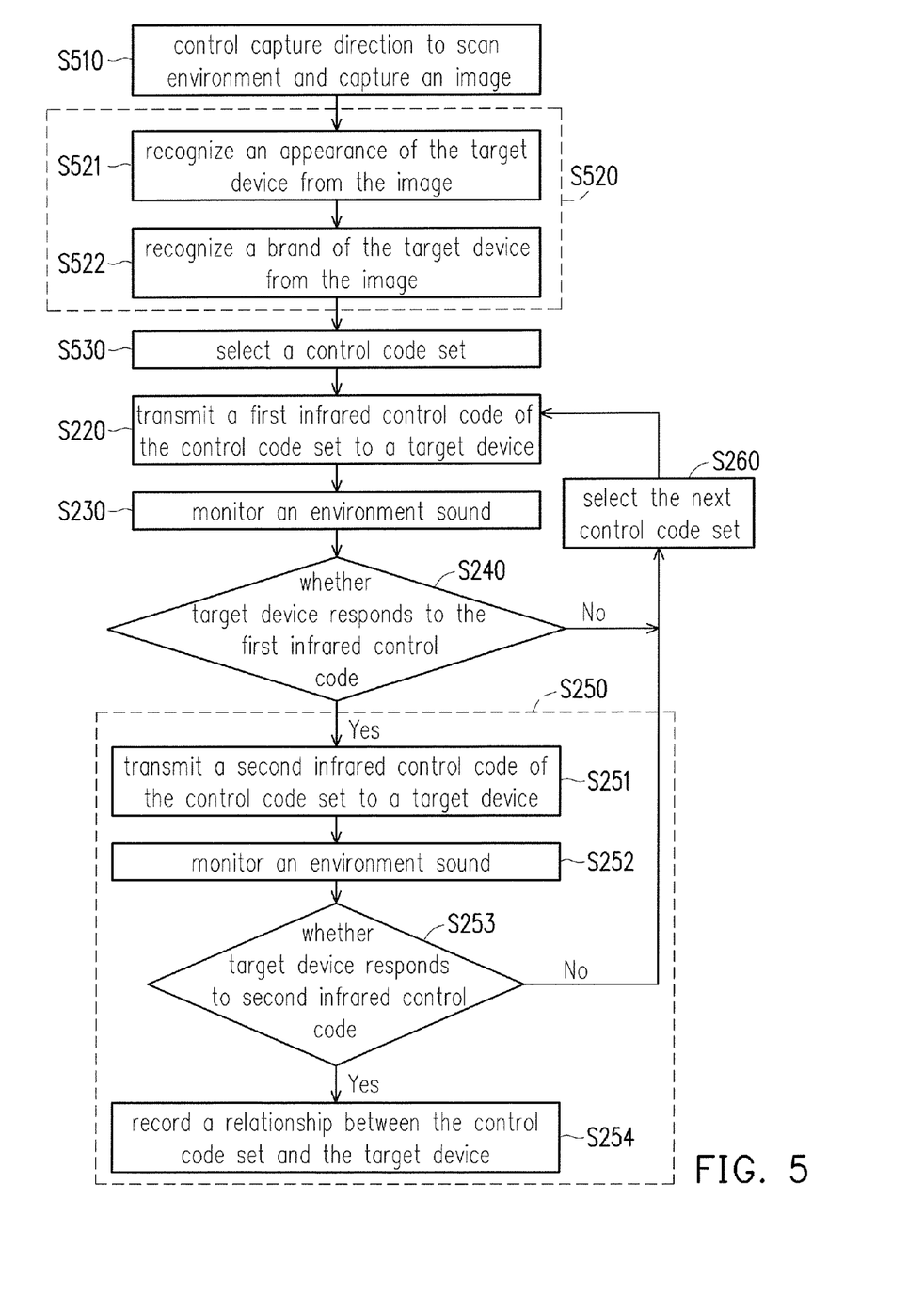
FIG. 5 a flow chart showing an operation method of an infrared remote control system in an embodiment.

FIG. 5 a flow chart showing an operation method of an infrared remote control system in an embodiment. Steps S220, S230, S240, S250, S251, S252, S253, S254 and S260 in FIG. 5 can refer to steps S220, S230, S240, S250, S251, S252, S253, S254 and S260 in FIG. 2 and FIG. 3.

Please refer to FIG. 4 and FIG. 5. In step S510, the direction driving module 470 adjusts a capture direction of the camera unit 450 according to the control of the processing unit 110. Therefore, the processing unit 110 controls the camera unit 450 to capture at least one image in the initialization period. In step S520, the processing unit 110 executes image-recognition in the initialization period to recognize a category or a brand of the target device 60 from the at least one image. The technology of the image-recognition in step S520 is not limited herein. In an embodiment, step S520 includes steps S521 and S522. In step S521, the processing unit 110 executes the image-recognition to recognize an appearance of the target device 60 from the image captured by the camera unit 450. The processing unit 110 determines the category of the target device 60 (such as the television category, an air conditioner category, a lamp category, an audible device category) according to the appearance of the target device 60. In step S522, the processing unit 110 executes the image-recognition to recognize a brand of the target device 60 from the image. For example, the processing unit 110 recognizes the brand on the target device 60 from the image. In step S530, the processing unit 110 selects one control code set from the database 140 according to the category and/or the brand of the target device 60 in the initialization period.

In an embodiment, step S521 or step S522 is omitted. If step S521 is omitted, the processing unit 110 selects one or multiple candidate control code sets from the database 140 in step S530 according to the brand recognized in step S522. If step S522 is omitted, the processing unit 110 selects one or multiple candidate control code sets from the database 140 in step S530 according to the appearance (the category of the target device 60) recognized in step S521. In an embodiment, the processing unit 110 selects a control code set from the one or multiple candidate control code sets to regard as a selected control code set in step S530. Step S530 can refer to step S210 in FIG. 2 and/or FIG. 3. After step S530 is finished, the processing unit 110 executes steps S220, S230, S240, S250, S251, S252, S253, S254 and/or S260 (please to the related illustration of FIG. 2 and/or FIG. 3). If the determination result of step S240 or S253 is "no", the processing unit 110 selects another selected control code set from the one or multiple control code sets (step S260), and then steps S220, S230, S240, S251, S252 and/or S253 are executed continuously until the determination result of step S240 and S253 are both "yes".

Figure 6:
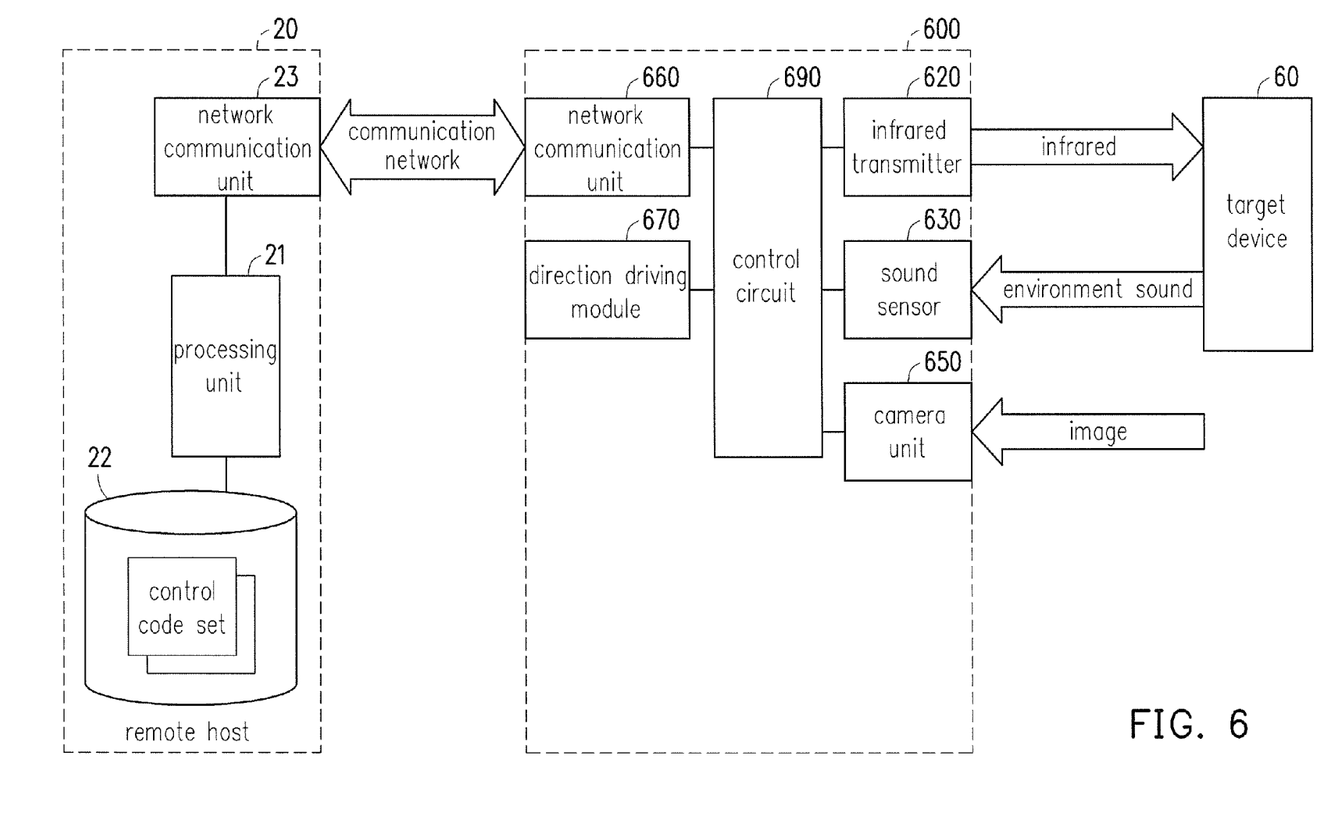
FIG. 6 is a block diagram showing a circuit of an infrared remote control system in an embodiment.

FIG. 6 is a block diagram showing a circuit of an infrared remote control system in an embodiment. The infrared remote control system shown in FIG. 6 includes a remote host 20 and an IP camera 600. The remote host 20 is a smartphone, a tablet computer, a notebook computer, a personal computer or a control platform, which is not limited herein. The remote host 20 is connected to the IP camera 600 via the communication network. In the embodiment, the processing unit 21 and the database 22 are disposed at the remote host 20, and the infrared transmitter 620 and the sound sensor 630 are disposed at the IP camera 600. The processing unit 21 is connected to the IP camera 600 via the communication network to control the infrared transmitter 620, and the processing unit 21 monitors the local environment sound via the sound sensor 630. The processing unit 21, the database 22, the infrared transmitter 620 and the sound sensor 630 shown in FIG. 6 can refer to the processing unit 110, the database 140, the infrared transmitter 120 and the sound sensor 130 in FIG. 1 and/or FIG. 4.

In an embodiment, the function of the processing unit 21 is realized by software, such as SolidWorks (SW), Java, which is not limited herein. In an embodiment, the function of the processing unit 21 is realized by hardware, such as a micro controller, a logic circuit, which is not limited herein. The method of realizing the function of the processing unit 21 is not limited herein. The processing unit 21 is coupled to the database 22 to access to the control code set.

The IP camera 600 further includes a camera unit 650, a network communication unit 660, a direction driving module 670 and a control circuit 690. The control circuit 690 integrates functional components needed by the IP camera 600. In the embodiment, the infrared transmitter 620, the sound sensor 630, the camera unit 650, the network communication unit 660 and the direction driving module 670 are coupled to the control circuit 690.

The processing unit 21 transmits an instruction to the communication network unit 660 of the IP camera 600 via the communication network through the network communication unit 23 of the remote host 20. The control circuit 690 receives the instruction from the network communication unit 660 and executes the instruction. For example, the control circuit 690 controls the direction driving module 670 to adjust the capture direction of the camera unit 650 according to the instruction of the remote host 20. The control circuit 690 adjusts a zoom factor of the image captured by the camera unit 650 according to the instruction of the remote host 20. The control circuit 690 provides the local image captured by the camera unit 650 to the remote host 20 via the network communication unit 660 and the communication network. The camera unit 650, the network communication unit 660 and the direction driving module 670 in FIG. 6 can refer to the camera unit 450, the network communication unit 460 and the direction driving module 470 in FIG. 4. The operation method of the infrared remote control system in FIG. 5 is also applied to the operation method of the infrared remote control system in FIG. 6.

Figure 7:
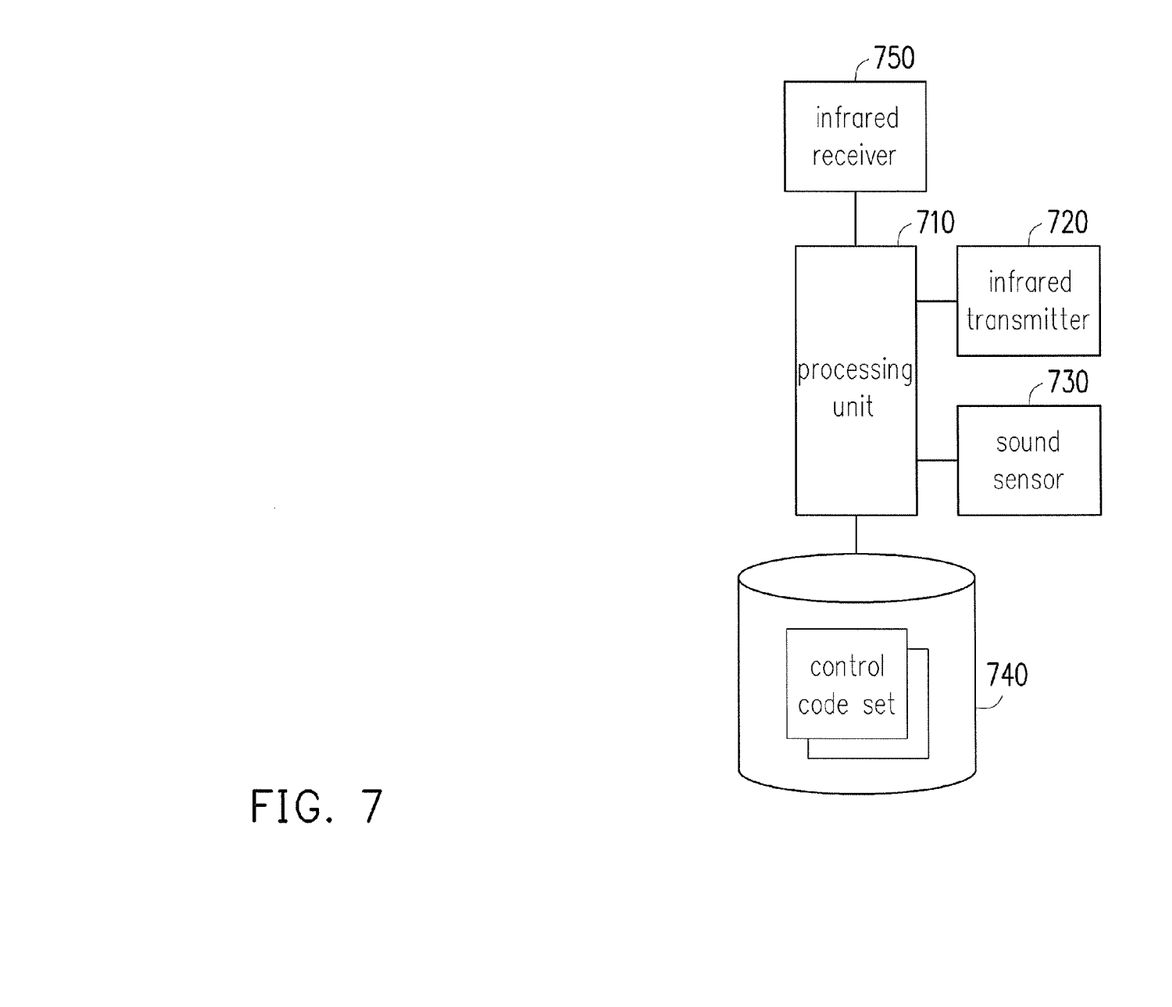
FIG. 7 is a block diagram showing a circuit of an infrared remote control system in an embodiment.

To meet different requirements, the processing unit can be adjusted or changed accordingly. FIG. 7 is a block diagram showing a circuit of an infrared remote control system in an embodiment. In the embodiment, the infrared remote control system includes a processing unit 710, an infrared transmitter 720, a sound sensor 730, a database 740 and an infrared receiver 750. The processing unit 710 is coupled to the infrared receiver 750, the database 740, the infrared transmitter 720 and the sound sensor 730. The processing unit 710, the infrared transmitter 720, the sound sensor 730 and the database 740 in FIG. 7 can refer to the processing unit 110, the infrared transmitter 120, sound sensor 130 and the database 140 in FIG. 1 or FIG. 4, or refer to the processing unit 21, the infrared transmitter 620, sound sensor 630 and the database 22 in FIG. 6, which are omitted herein for a concise purpose. In the embodiment in FIG. 7, the processing unit 710 receives and learns the infrared control code of the target device via the infrared receiver 750.

In sum, the remote host is connected to the IP camera via the communication network. The IP camera transmit the infrared control code to the local infrared controlled device (the target device) according to the control of the remote host, the sound sensor monitors the change of the environment sound simultaneously and the information that whether the environment sound changes is transmitted back to the processing unit to make determination. The IP camera determines whether the target device responds to the infrared control code according to the information whether the environment sound changes, then, whether needs to transmit the infrared control code again is further determined. Consequently, the remote host determines the state of the local infrared controlled device (the target device) and whether the local infrared controlled device is controlled by the remote host via the remote control.

Although the invention has been disclosed with reference to certain preferred embodiments thereof, the disclosure is not for limiting the scope. Persons having ordinary skill in the art may make various modifications and changes without departing from the spirit and the scope of the invention. Therefore, the scope of the appended claims should not be limited to the description of the preferred embodiments described above.

What is claimed is:

1. An infrared remote control system, comprising:
   a sound sensor;
   an infrared transmitter; and
   a processing unit, wherein the processing unit controls the infrared transmitter to transmit a first infrared control code of a first control code set to a target device in an initialization period, and the processing unit monitors an environment sound via the sound sensor and determines whether the target device responds to the first infrared control code, if the processing unit determines that the target device responds to the first infrared control code according to the environment sound, the processing unit records a relationship between the first control code set and the target device,
   wherein the processing unit controls the infrared transmitter to transmit a second infrared control code of the first control code set to the target device, and the processing unit monitors the environment sound via the sound sensor to determine whether the target device responds to the second infrared control code to confirm relationship between the first control code set and the target device.

2. The infrared remote control system according to claim 1, wherein the sound sensor, the infrared transmitter and the processing unit are disposed at an Internet Protocol (IP) camera.

3. The infrared remote control system according to claim 1, wherein the sound sensor and the infrared transmitter are disposed at an IP camera, the processing unit is disposed at a remote host, the processing unit is connected to the IP camera via a communication network to control the infrared transmitter, and the processing unit monitors the environment sound via the sound sensor.

4. The infrared remote control system according to claim 1, further comprising:
   a camera unit; and
   a direction driving module, wherein the direction driving module adjusts a capture direction of the camera unit according to control of the processing unit;
   wherein the processing unit controls the capture direction of the camera unit to capture at least an image in the initialization period; and
   the processing unit executes image-recognition to recognize a category or a brand of the target device from the image in the initialization period.

5. The infrared remote control system according to claim 4, wherein the processing unit selects the first control code set from a database according to the category or the brand of the target device in the initialization period.

6. The infrared remote control system according to claim 1, wherein if the target device does not respond to the first infrared control code of the first control code set, the processing unit selects a next control code set from the database in the initialization period; the processing unit controls the infrared transmitter to transmit a third infrared control code of the next control code set to the target device in the initialization period, and the processing unit monitors the environment sound via the sound sensor to determine whether the target device responds to the third infrared control code; and if the processing unit determines that the target device responds to the third control code of the next control code set according to the environment sound, the processing unit record a relationship between the next control code set and the target device.

7. The infrared remote control system according to claim 1, further comprising:
   an infrared receiver, coupled to the processing unit, wherein the processing unit receives and learns the infrared control code of the target device via the infrared receiver.

8. An operation method of an infrared remote control system, comprising:
   controlling an infrared transmitter to transmit a first infrared control code of a first control code set to a target device in an initialization period by a processing unit;
   monitoring an environment sound by a sound sensor to determine whether the target device responds to the first infrared control code;
   controlling the infrared transmitter to transmit a second infrared control code of the first control code set to the target device by the processing unit if the target device responds to the first infrared control code;
   monitoring the environment sound by the sound sensor to determine whether the target device responds to the second infrared control code; and
   confirming and recording a relationship between the first control code set and the target device by the processing unit if the processing unit determines the target device responds to the second infrared control code according to the environment sound.

9. The operation method of the infrared remote control system according to claim 8,
   wherein the sound sensor, the infrared transmitter and the processing unit are disposed at an IP camera.

10. The operation method of the infrared remote control system according to claim 8, wherein the sound sensor and the infrared transmitter are disposed at an IP camera, and the processing unit is disposed at a remote host, the processing unit is connected to the IP camera via an communication network to control the infrared transmitter, and the processing unit monitors the environment sound via the sound sensor.

11. The operation method of the infrared remote control system according to claim 8, further comprising:
   controlling a capture direction of a camera unit to capture at least an image in the initialization period via the processing unit; and
   executing image-recognition via the processing unit to recognize a category or a brand of the target device from the at least image in the initialization period.

12. The operation method of the infrared remote control system according to claim 11, further comprising:
   selecting the first control code set from a database via the processing unit according to the category or the brand of the target device in the initialization period.

13. The operation method of the infrared remote control system according to claim 8, further comprising:
   selecting a next control code set from database in the initialization period via the processing unit if the target device does not respond to the first infrared control code of the first control code set;

controlling the infrared transmitter to transmit a first control code of the next control code set to the target device in the initialization period via the processing unit;

monitoring the environment sound via the sound sensor to determine whether the target device responds to the first control code of the next control code set; and recording the relationship between the second control code set and the target device via the processing unit if the processing unit determines that the target device responds to the first control code of the next control code set according to the environment sound.

14. An infrared remote control system, comprising:

a sound sensor;

an infrared transmitter; and a processing unit, wherein the processing unit controls the infrared transmitter to transmit a first infrared control code of a first control code set to a target device in an initialization period, and the processing unit monitors an environment sound via the sound sensor and determines whether the target device responds to the first infrared control code, if the processing unit determines that the target device responds to the first infrared control code according to the environment sound, the processing unit records a relationship between the first control code set and the target device, wherein the sound sensor and the infrared transmitter are disposed at an IP camera, the processing unit is disposed at a remote host, the processing unit is connected to the IP camera via a communication network to control the infrared transmitter, and the processing unit monitors the environment sound via the sound sensor.

* * * * *